US009087265B2

(12) United States Patent
Saruta et al.

(10) Patent No.: US 9,087,265 B2
(45) Date of Patent: Jul. 21, 2015

(54) RECOGNITION APPARATUS AND METHOD THEREOF, AND COMPUTER PROGRAM

(75) Inventors: Takayuki Saruta, Tokyo (JP); Masakazu Matsugu, Yokohama (JP); Masato Aoba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 876 days.

(21) Appl. No.: 13/030,956

(22) Filed: Feb. 18, 2011

(65) Prior Publication Data

US 2011/0206237 A1 Aug. 25, 2011

(30) Foreign Application Priority Data

Feb. 25, 2010 (JP) ................. 2010-041003

(51) Int. Cl.
*G06K 9/00* (2006.01)
*G06K 9/46* (2006.01)
*G01B 11/00* (2006.01)

(52) U.S. Cl.
CPC .............. *G06K 9/4661* (2013.01); *G01B 11/00* (2013.01)

(58) Field of Classification Search
CPC .......... G01N 21/57; G01N 2021/4735; G01N 21/4738; G06K 9/4661; G06T 7/0073; G01B 11/24; G01B 11/245; H04N 13/0239
USPC ................................................. 382/103, 154
See application file for complete search history.

(56) References Cited

U.S. PATENT DOCUMENTS

| 5,930,383 | A  | * | 7/1999  | Netzer ........................... 382/154 |
| 7,707,128 | B2 |   | 4/2010  | Matsugu ......................... 706/18  |
| 7,766,828 | B2 |   | 8/2010  | Ishii et al. ..................... 600/300 |
| 2001/0033685 | A1 | * | 10/2001 | Ishiyama ....................... 382/154 |
| 2002/0186878 | A1 | * | 12/2002 | Hoon et al. .................... 382/149 |
| 2007/0176927 | A1 | * | 8/2007  | Kato et al. ..................... 345/426 |
| 2008/0211904 | A1 |   | 9/2008  | Kato et al. ..................... 348/143 |

(Continued)

FOREIGN PATENT DOCUMENTS

JP    2008065378    3/2008

OTHER PUBLICATIONS

H. Bay et al., "Speeded-Up Robust Features" (SURF), Computing Vision and Image Understanding, vol. 110 (3), Jun. 2008.

(Continued)

*Primary Examiner* — Kim Vu
*Assistant Examiner* — Michael Vanchy, Jr.
(74) *Attorney, Agent, or Firm* — Fitzpatrick, Cella, Harper & Scinto

(57) ABSTRACT

A recognition apparatus for recognizing a position and an orientation of a target object, inputs a captured image of the target object captured by an image capturing apparatus; detects a plurality of feature portions from the captured image, and to extract a plurality of feature amounts indicating image characteristics in each of the plurality of feature portions; inputs property information indicating respective physical properties in the plurality of feature portions on the target object; inputs illumination information indicating an illumination condition at the time of capturing the captured image; determines respective degrees of importance of the plurality of extracted feature amounts based on the respective physical properties indicated by the property information and the illumination condition indicated by the illumination information; and recognizes the position and the orientation of the target object based on the plurality of feature amounts and the respective degrees of importance thereof.

8 Claims, 10 Drawing Sheets

(56) References Cited

U.S. PATENT DOCUMENTS

| | | | |
|---|---|---|---|
| 2009/0148036 A1* | 6/2009 | Aoyama | 382/154 |
| 2010/0161125 A1 | 6/2010 | Aoba et al. | 700/254 |
| 2011/0037984 A1 | 2/2011 | Yoshikawa et al. | 356/445 |

OTHER PUBLICATIONS

E. Tola et al., "A Fast Local Descriptor for Dense Matching", CVPR, 2008.

K. Mikolajczyk et al., "A Performance Evaluation of Local Descriptors", PAMI 27(10), 2004.

J. Zhang, et al., "Local Features and Kernels for Classification of Texture and Object Categories: A Comprehensive Study", International Journal of Computer Vision, 2006.

B. Leibe et al., "Scale-Invariant Object Categorization using a Scale-Adaptive Mean-Shift Search", DAGM'04 Pattern Recognition Symposium.

\* cited by examiner

RECOGNITION APPARATUS AND METHOD THEREOF, AND COMPUTER PROGRAM

BACKGROUND OF THE INVENTION

1. Field of the Invention

The present invention relates to a recognition apparatus and method thereof, and a computer program and, more particularly, to a technique for recognizing a target object from an image captured by an image capturing apparatus in an environment which often suffers illumination variations at the times of learning and recognition.

2. Description of the Related Art

In recent years, the demand for robots, for example, to execute assembly jobs in factories has been increasing. Of such jobs, when robots handle job target objects, which do not have constant positions and orientations all the time, In these jobs, the use of a visual sensor is generally popular as a mechanism that is required to measure the positions and orientations of the target objects in a job when robots handle target objects of a job.

In order to cause the robots to perform, for example, more advanced assembly jobs, components that are to be assembled must be recognized by the visual sensor. Conventionally, studies have been made to recognize the types, positions and orientations of components by collating shape information such as CAD data of components with two- or three-dimensional information obtained by, for example, the visual sensor. As one of these recognition methods, the following extensive study has been made. That is, a computer learns feature amounts extracted from an image of a target object obtained by an image capturing apparatus, and recognizes the type of object included in an input image.

However, in case of the object recognition technique using an image, the recognition ratio is lowered when illumination variations occur during times of learning and recognition due to observations of specular reflection and glosses and changes in illumination direction and intensity on objects, or changes in positional relationships among an illumination, image capturing apparatus, and object.

Hence, studies have been made concerning those recognitions that cope with illumination variations during times of learning and recognition. As a method that is robust against illumination variations, a method which uses image features such as edges, which are used in learning and recognition and suffer less illumination variations is known. Alternatively, a method of obtaining a three-dimensional structure using, for example, a rangefinder, and simulating variations at the time of recognition, or a method using learning data including various illumination variations is known.

Japanese Patent Laid-Open No. 2008-65378 describes an arrangement for recognizing an image even when the illumination condition at the time of learning is different from that at the time of recognition. In the arrangement of Japanese Patent Laid-Open No. 2008-65378, the captured images of a target object to be recognized, which have been successfully recognized, are stored as registered images. During actual recognition, when recognition of a captured image has failed, one feature point of a target object to be recognized in a region that expresses the target object to be recognized in the captured image is detected. Then, a mapping function that represents a relationship between the pixel value of the detected feature point and those of feature points of registered images at the same position as the detected feature point is calculated, and pixel values of the captured image are corrected using the mapping function, thereby correcting illumination variations.

In case of a recognition technique that learns an identification function by extracting a certain feature amount from an image, and maps that feature amount on a feature space configured by feature amount vectors, when illumination variations occur between the times of learning and recognition, it is difficult to identify a target object with high precision.

In the arrangement of Japanese Patent Laid-Open No. 2008-65378, when recognition has failed, one feature point is detected, and a correction is executed based on a relationship between the pixel value of that feature point and those of feature points obtained at the time of learning. In order to calculate a mapping function used in correction, feature point correspondences have to be obtained. Japanese Patent Laid-Open No. 2008-65378 describes that feature point correspondences are obtained by extracting eyes, eyebrows, and flesh color regions of human faces or using markers. This method is effective when specific portions and feature points of target objects can be detected, and when corresponding points are uniquely determined based on markers. However, this method requires to find corresponding points used in correction, and cannot attain precise correction when the correspondence becomes indefinite or correspondence errors occur due to illumination variations.

SUMMARY OF THE INVENTION

The present invention has been made to solve the aforementioned problems, and aims to provide a technique that can stably recognize a target object even in an environment that suffers illumination variations.

According to one aspect of the present invention, a recognition apparatus for recognizing a position and an orientation of a target object, includes: a first input unit adapted to input a captured image of the target object captured by an image capturing apparatus; an extraction unit adapted to detect a plurality of feature portions from the captured image, and to extract a plurality of feature amounts indicating image characteristics in each of the plurality of feature portions; a second input unit adapted to input property information indicating respective physical properties in the plurality of feature portions on the target object; a third input unit adapted to input illumination information indicating an illumination condition at the time of capturing the captured image; a determination unit adapted to determine respective degrees of importance of the plurality of extracted feature amounts based on the respective physical properties indicated by the property information and the illumination condition indicated by the illumination information; and a recognition unit adapted to recognize the position and the orientation of the target object based on the plurality of feature amounts and the respective degrees of importance thereof.

According to another aspect of the present invention, a recognition apparatus for recognizing a position and an orientation of a target object, includes: a first input unit adapted to input a captured image of the target object captured by an image capturing apparatus; an extraction unit adapted to detect a plurality of feature portions from the captured image, and to extract a plurality of feature amounts indicating image characteristics in each of the plurality of feature portions; a second input unit adapted to input property information indicating respective physical properties in the plurality of feature portions on the target object; a third input unit adapted to input illumination information indicating an illumination condition at the time of capturing the captured image; a change unit adapted to change an image capturing condition in which the image capturing apparatus captures an image of the target object, based on the respective physical properties indicated by the property information and the illumination condition indicated by the illumination information; and a recognition unit adapted to recognize the position and the orientation of the target object based on the feature amounts extracted from the captured image of the target object captured under the changed image capturing condition.

According to still another aspect of the present invention, a method for recognizing a position and an orientation of a target object, includes: inputting a captured image of the target object captured by an image capturing apparatus; detecting a plurality of feature portions from the captured image, and extracting a plurality of feature amounts indicating image characteristics in each of the plurality of feature portions; inputting property information indicating respective physical properties in the plurality of feature portions on the target object; inputting illumination information indicating an illumination condition at the time of capturing the captured image; determining respective degrees of importance of the plurality of extracted feature amounts based on the respective physical properties indicated by the property information and the illumination condition indicated by the illumination information; and recognizing the position and the orientation of the target object based on the plurality of feature amounts and the respective degrees of importance thereof.

According to yet another aspect of the present invention, a method for recognizing a position and an orientation of a target object, includes: inputting a captured image of the target object captured by an image capturing apparatus; detecting a plurality of feature portions from the captured image, and extracting a plurality of feature amounts indicating image characteristics in each of the plurality of feature portions; inputting property information indicating respective physical properties in the plurality of feature portions on the target object; inputting illumination information indicating an illumination condition at the time of capturing the captured image; changing an image capturing condition in which the image capturing apparatus captures an image of the target object, based on the respective physical properties indicated by the property information and the illumination condition indicated by the illumination information; and recognizing the position and the orientation of the target object based on the feature amounts extracted from the captured image of the target object captured under the changed image capturing condition.

Further features of the present invention will become apparent from the following description of exemplary embodiments (with reference to the attached drawings).

DESCRIPTION OF THE EMBODIMENTS

Embodiments of the present invention will be described in detail hereinafter with reference to the accompanying drawings.

(Functional Arrangement of Target Object Recognition System)

Figure 1:
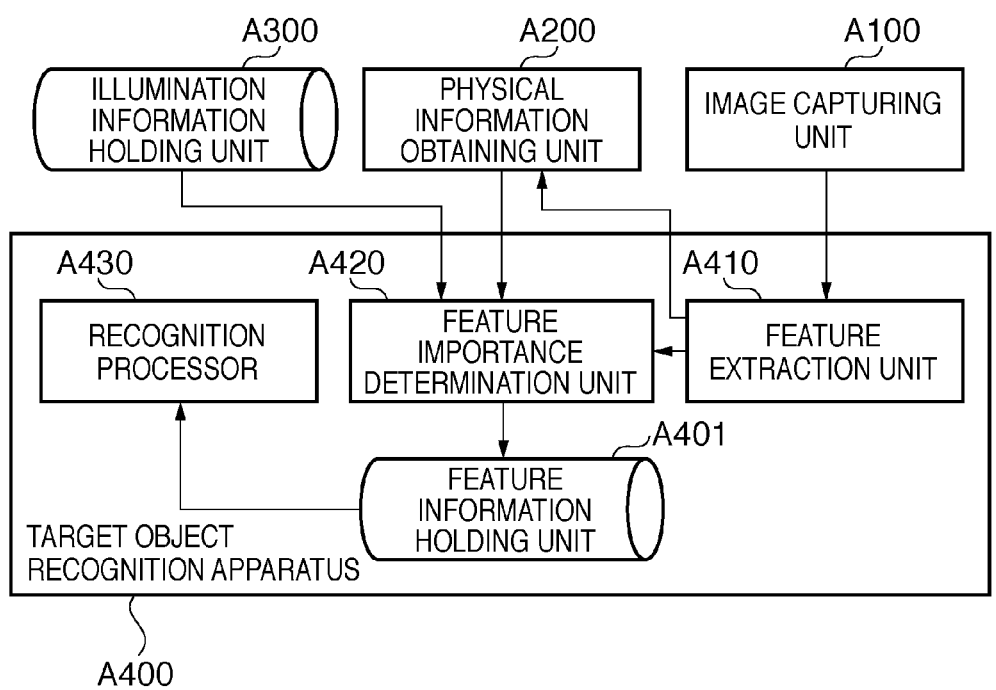
FIG. 1 is a block diagram showing the functional arrangement of a target object recognition system.

FIG. 1 shows an example of a basic functional arrangement of a target object recognition system according to an embodiment of the present invention.

An image capturing unit A100 is used to obtain image data. The image capturing unit A100 captures an image of a target object, and supplies a captured image to a target object recognition apparatus A400. A physical information obtaining unit A200 obtains physical information (property information) that indicates the physical properties such as a normal vector, object reflectance, and reflectance characteristics (diffusion reflectance and specular reflectance) of the surface of the target object. An illumination information holding unit A300 holds, as illumination information, information indicating the illumination condition including the positions/directions of an illumination and camera (image capturing unit), and illumination intensity.

A target object recognition apparatus A400 makes various calculations for recognition, and includes a feature extraction unit A410, feature importance determination unit A420, recognition processor A430, and feature information holding unit A401. The feature extraction unit A410 extracts features (feature portions) such as luminance gradients and feature points (for example, keypoints to be described later) and feature amounts indicating image characteristics in the features by analyzing a captured image. Also, the feature extraction unit A410 inputs a captured image of a target object captured by an image capturing apparatus under a predetermined illumination condition.

The feature importance determination unit A420 determines the degrees of importance of the extracted feature amounts based on the physical information of the surface of a target object and the illumination information. Note that the feature importance determination unit A420 inputs the property information indicating the physical properties of a plurality of feature portions on a target object, and the illumination information indicating the illumination condition at the time of capturing of a captured image.

The recognition processor A430 recognizes, for example, the type and the position and orientation of a target object based on the features extracted by the feature extraction unit A410, and the degrees of importance of the features determined by the feature importance determination unit A420. In case of recognition, processing is executed based on feature amounts weighted by their degrees of importance. The feature information holding unit A401 holds pieces of feature information, the degrees of importance of which are determined by the feature importance determination unit A420.

(Hardware Arrangement of Target Object Recognition Apparatus)

Figure 10:
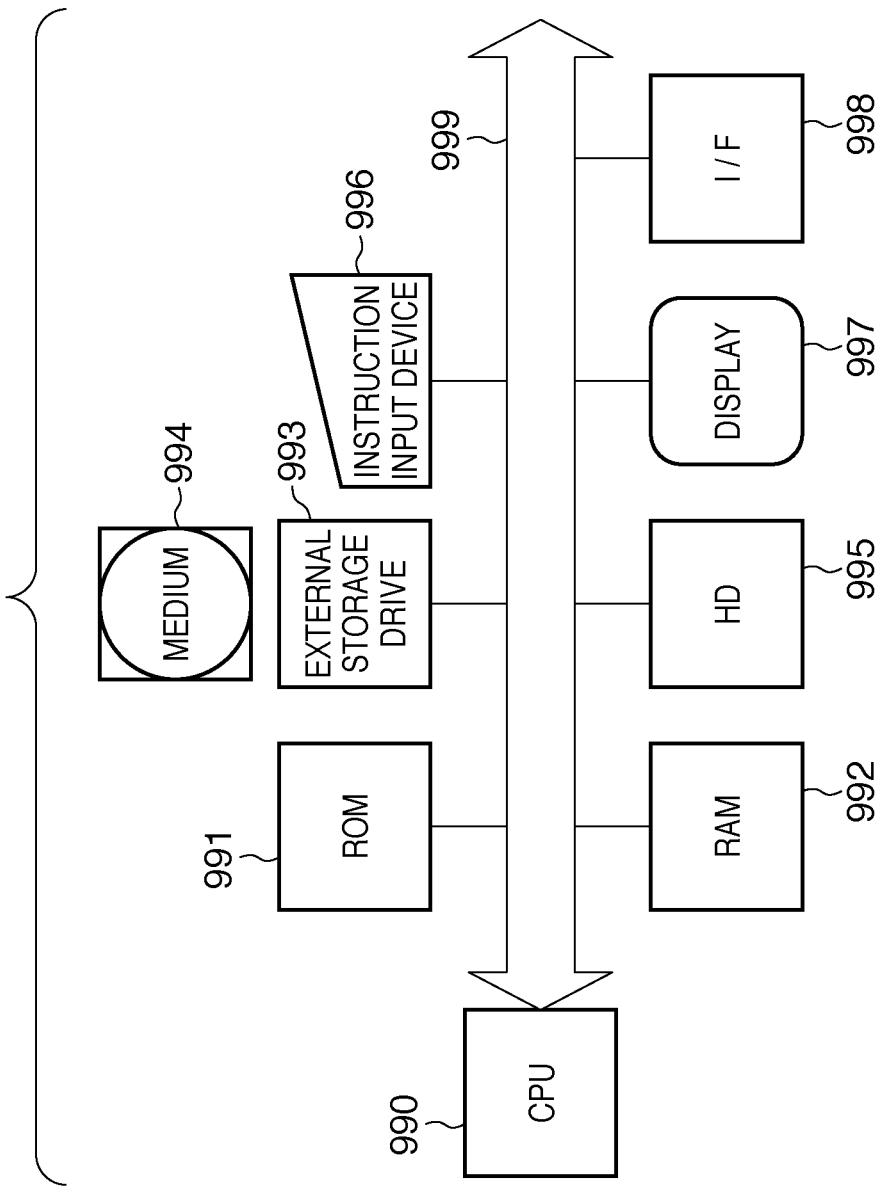
FIG. 10 is a block diagram showing the hardware arrangement of a target object recognition apparatus.

FIG. 10 is a block diagram showing an example of the hardware arrangement of the target object recognition apparatus A400. The target object recognition apparatus A400 is implemented by, for example, a personal computer (PC), workstation (WS), mobile terminal, or smartphone.

Referring to FIG. 10, a CPU 990 is a central processing unit, which controls the operation of the overall target object recognition apparatus A400 based on computer programs including an operating system (OS) and application programs in cooperation with other components. A ROM 991 is a read-only memory, which stores, for example, programs such as a basic I/O program, and data used in basic processing. A RAM 992 is a writable memory, and serves as, for example, a work area of the CPU 990.

An external storage drive 993 realizes accesses to a recording medium, and can load programs stored in a medium (recording medium) 994 onto this system. The medium 994 includes, for example, a flexible disk (FD), CD-ROM, DVD, USB memory, and flash memory. An external storage device 995 serves as a large-capacity memory, and adopts a hard disk device (to be referred to as an HD hereinafter) in this embodiment. The HD 995 stores the OS, application programs, and the like.

An instruction input device 996 accepts instructions and commands input by the user, and corresponds to a keyboard, pointing device, touch panel, etc. A display 997 displays commands input from the instruction input device 996 and responses to these commands of the target object recognition apparatus A400. An interface (I/F) 998 is a device which relays data exchanged with an external apparatus. A system bus 999 is a data bus which controls data flows in the target object recognition apparatus A400.

(Overview of Target Object Recognition Processing)

Figure 2:
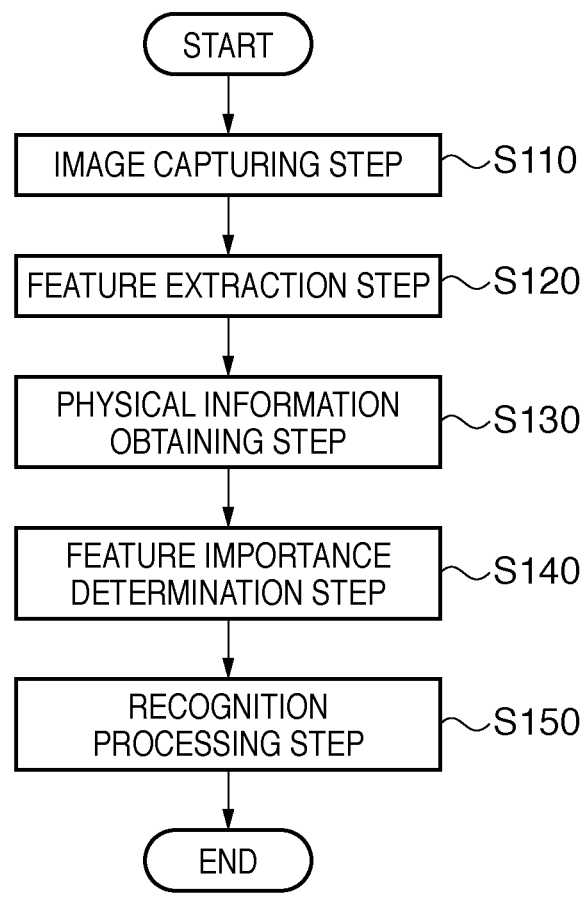
FIG. 2 is a flowchart showing the sequence of target object recognition processing.

An overview of target object recognition processing in the target object recognition system according to this embodiment will be described below with reference to FIG. 2.

In an image capturing step (S110), the image capturing unit A100 performs image capturing. Image data obtained by the image capturing is transmitted to the feature extraction unit A410.

In a feature extraction step (S120), the feature extraction unit A410 obtains features and feature amounts which describe these features from the image captured in step S110. The obtained features and feature amounts are transmitted to the physical information obtaining unit A200 and feature importance determination unit A420. Note that features (feature portions) are points or regions each of which occupies a predetermined range.

In a physical information obtaining step (S130), the physical information obtaining unit A200 obtains pieces of physical information of surfaces near the features extracted in step S120. The obtained pieces of physical information are transmitted to the feature importance determination unit A420. The pieces of physical information may be obtained and stored in advance. In this case, the physical information obtaining unit A200 is used as a storage device.

In a feature importance determination step (S140), the feature importance determination unit A420 determines a degree of importance of each of the features extracted in step S120 based on both of:
  the physical information obtained in step S130; and
  at least one of an illumination direction and image capturing unit direction when viewed from that feature position held in the illumination information holding unit A300.

The features whose degrees of importance are determined, and the degrees of importance are transmitted to and held in the feature information holding unit A401.

In a recognition processing step (S150), the recognition processor A430 executes predetermined recognition processing using the features whose degrees of importance are determined in step S140 and the feature amounts, thus recognizes a target object.

(Practical Example of Target Object Recognition System)

Figure 3A:
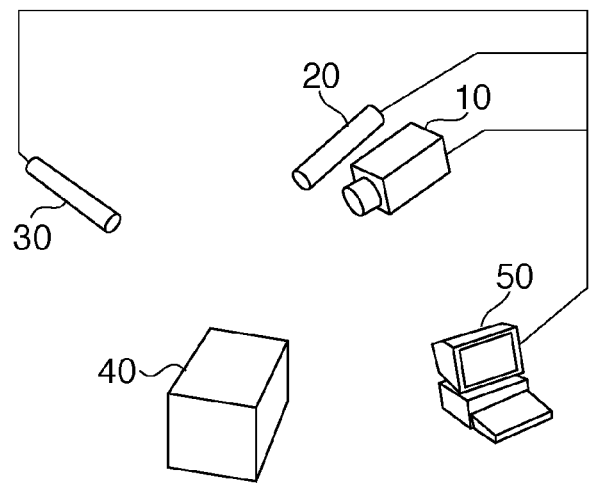
FIGS. 3A, 3B, and 3C are views showing an example of the configuration of the target object recognition system.

FIG. 3A shows an example of the practical configuration of the target object recognition system according to this embodiment.

A camera 10 serves as the image capturing unit A100, and captures an image of a target object 40 as a target to be captured. A distance sensor 20 serves as the physical information acquisition unit A200, and acquires a normal vector as one of pieces of physical information of the surface of the target object 40. Other pieces of physical information of the target object surface include, for example, an object reflectance and reflectance characteristics (diffusion reflectance and specular reflectance). An illumination 30 irradiates the target object 40 with light. Illumination information including the position, irradiation direction, and intensity of the illumination 30 is obtained in advance, and is held in the illumination information holding unit A300.

A computer 50 serves as the target object recognition apparatus A400, and implements the feature extraction unit A410, feature importance determination unit A420, and recognition processor A430 by executing programs. The computer 50 includes the physical information obtaining unit A200 (an interface corresponding to that unit) which can obtain physical information by operating the distance sensor 20. The computer 50 includes a memory that can be used as the feature information holding unit A401, and externally or internally has a non-volatile storage device that can be used as the illumination information holding unit A300. These storage devices can be implemented by, for example, the RAM 992 and HD 995. The computer 50 is connected to the camera 10, distance sensor 20, and illumination 30, but the illumination 30 may be separated from the computer 50.

(Details of Target Object Recognition Processing)

The practical processing contents executed by the target object recognition system according to this embodiment will be described below along the processing sequence shown in FIG. 2.

Image Capturing Step (S110)

In step S110, an image of the target object 40 is captured by the camera 10 to obtain image data. Pieces of information such as the positions/directions of the camera 10 and illumination 30, which are used to capture the image of the target object at the time of image capturing, are obtained in advance, and are held in the illumination information holding unit A300.

Feature Extraction Step (S120)

In step S120, feature points and feature amounts which describe information around these feature points (surrounding information of feature points) are extracted from the image obtained in step S110. As a feature amount, for example, that such as "SURF" (c.f. non-patent reference 1) which describes information such as a luminance gradient around an extracted feature point can be used. In addition, as feature points, for example, those such as so-called keypoints (c.f. non-patent references 2 and 3) can be used. In this case, letting $x_i$ and $y_i$ be image coordinates, each feature point is expressed by $f_i=(x_i, y_i)$ (i=1, 2, . . . , N). Also, let $F_i$ (i=1, 2,. . ., N) be a feature amount vector which expresses a feature amount, where N is the total number of feature points obtained from an image, and i is an index indicating each feature point.

[Non-Patent Reference 1] H. Bay, Speeded-Up Robust Features (SURF), Computing Vision and Image Understanding, Vol. 110(3) June 2008, pp. 346-359.

[Non-Patent Reference 2] E. Tola, A Fast Local Descriptor for Dense Matching, CVPR 2008.

[Non-Patent Reference 3] K. Mikolajczyk, A Performance Evaluation of Local Descriptors, PAMI, 27(10) 2004, pp. 1615-1630.

Physical Information Obtaining Step (S130)

In step S130, pieces of physical information of surfaces near the feature points $f_i$ extracted in step S120 are obtained. As the physical information, a parameter or vector such as a object reflectance or normal vector, which is unique to the vicinity of an object or a feature point, may be used. In this case, the distance sensor 20 obtains a normal vector as the physical information. In this case, let $n_i$ (i=1, 2, ..., N) be a normal vector to the feature point $f_i$. The normal vector can be calculated by executing principal component analysis of a vector group from three-dimensional coordinates corresponding to a feature point to those corresponding to neighboring pixels. The above process is repeated for respective feature points. When a normal vector cannot be measured, that fact is recorded. When a normal vector cannot be measured, $n_i$=(0, 0, 0) in this embodiment.

Feature Importance Determination Step (S140)

In step S140, a degree of importance of each feature point $f_i$ extracted in step S120 is determined based on both of:

the normal vector $n_i$ obtained in step S130; and at least one of the illumination direction and image capturing unit direction when viewed from that feature point position.

The illumination direction and image capturing unit direction when viewed from the feature point position can be calculated based on, for example, the three-dimensional positions of the illumination and image capturing apparatus held in the illumination information holding unit A300 and that of the feature point obtained using, for example, the distance sensor.

Figure 3B:
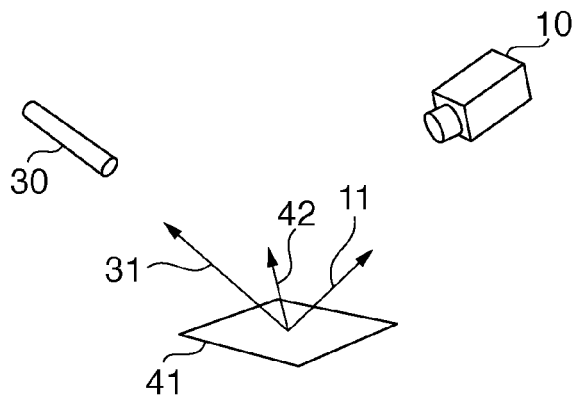

FIG. 3B is a view showing a normal vector 42, illumination direction 31, and image capturing unit direction (direction of the camera 10 when viewed from a feature point) 11 in association with a feature point 41. For the sake of simplicity, a case will be explained below wherein the direction of the optical axis of the camera 10 is coaxial with that of an illumination 30, that is, the optical axis of the camera 10 agrees with that of the illumination 30. Let $l_i$ (i=1, 2,..., N) be the illumination direction and image capturing unit direction when viewed from a position of each feature point $f_i$.

The degree of importance of each feature point $f_i$ is determined based on the relationship with a feature point (amount) group (learning samples) obtained in advance at the time of learning. Learning samples are obtained in advance by capturing images of a target object from various illumination directions and image capturing unit directions. In this case as well, assume that a normal vector near each feature point, the illumination position, and the position of the image capturing apparatus are obtained.

In this case, a degree of importance is evaluated and determined based on the illumination direction (image capturing unit direction) when viewed from the position of a feature point of interest, and the normal vector near that feature point. As a determination method, for example, a method of evaluating the degree of importance based on an angle between the illumination direction and normal vector, and a method of generating a histogram by quantizing the illumination direction and normal vector, and evaluating the degree of importance based on the histogram are available. To the degree of importance, for example, "0" or "1" or a real number ranging from "0" to "1" may be assigned.

[Importance Evaluation Based on Angle between Vectors]

The method of evaluating the degree of importance based on the angle between the illumination direction and normal vector will be described first. In this method, when a learning sample having the same angle as that between two direction vectors of a feature point $f_i$ is available, a degree of importance of this feature point $f_i$ is set to be high. For example, a degree of importance $\omega_i$ of the feature point $f_i$ is expressed as a function of an angle $\theta_i$ between the normal vector $n_i$ and the illumination direction vector $l_i$ when viewed from the feature point. In this case, the angle $\theta_i$ (i=1, 2, ..., N) is expressed by:

$$\theta_i = \cos^{-1} \frac{n_i \times l_i}{|n_i||l_i|} \quad (i = 1, 2, \ldots, N) \quad (1)$$

Angles $\theta_i$ are calculated for all N feature points using equation (1). With reference to a list of angles $\theta$ between the illumination directions and normal vectors for each $\theta_i$, when a learning sample near $\theta_i$ is available, a degree of importance is set to be "1"; otherwise, it is set to be "0". As will be described later, a feature point (that is, a feature point with a degree of importance=0), which is obtained under an optical condition that is not obtained in learning samples is not used in subsequent recognition processing. Note that the value of a degree of importance of a learning sample near $\theta_i$ may be determined between "1" and "0". In this case, letting $\theta'$ be a list of $\theta$ corresponding to $\theta_i$, a degree of importance $\omega_i$ is determined based on a difference between $\theta_i$ and $\theta'$, as given by:

$$\omega_i = \frac{\alpha}{\varepsilon|\theta_i - \theta'| + 1} \quad (2)$$

where $\alpha$ is the number of samples included in the list of $\theta$, and $\varepsilon$ is a predetermined constant.

If the number of learning samples corresponding to $\theta_i$ is larger, since features are more likely to be obtained under the same positional condition (the positional relationship among the feature point, illumination, and image capturing apparatus) as that of the feature point $f_i$, a high degree of importance is set. This embodiment focuses attention only on the angle between vectors, but may focus attention on, for example, illumination intensity. Since this embodiment uses a local feature amount using a luminance gradient as an image feature, attention is focused on the angle between the illumination direction when viewed from the feature point and the normal vector. For a feature point whose normal vector cannot be obtained, that is, a feature point with $n_i$=(0, 0, 0), a degree of importance is set to be "1" or "0". In this case, whether "1" or "0" is set is determined at the time of learning.

[Importance Evaluation Using Histogram]

Figure 4A:
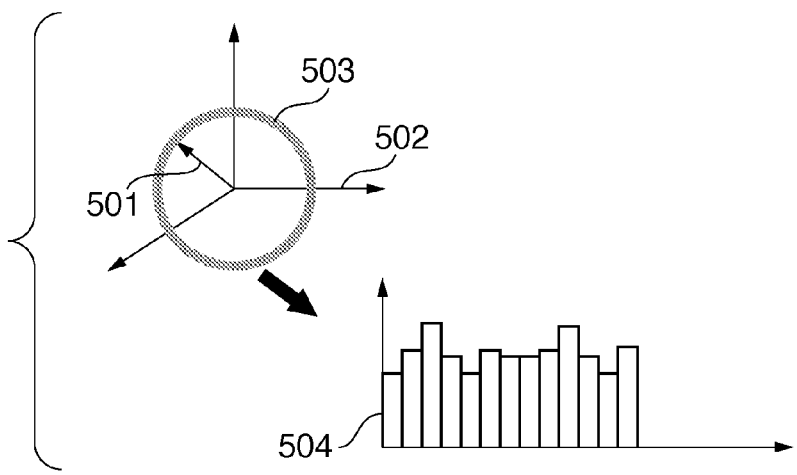
FIGS. 4A, 4B, and 4C are views showing the distribution of pieces of information indicating illumination conditions on a three-dimensional space.
Figure 4B:
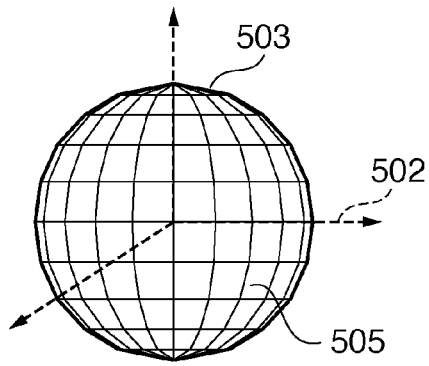

The method of generating a histogram by quantizing the illumination direction and normal vector and evaluating the degree of importance based on the histogram will be described below. As shown in FIG. 4A, a histogram 504 having a divided plane of a sphere 503 as one cell is generated by plotting an illumination direction vector 501 when viewed from a feature point on the sphere 503 assured on a three-dimensional space coordinate system 502. For example, when the sphere is divided, as shown in FIG. 4B, a divided plane of the sphere which indicates one cell is as denoted by reference numeral 505. As for a division method, the sphere may be divided by a polyhedron approximation method like a geodetic dome, or a division method may be learned and determined to obtain a higher recognition ratio. A degree of importance $\alpha_k$ corresponding to each cell k is calculated from the number of learning samples included in the cell k and the total number of learning samples, as given, for example, by:

$$\alpha_k=\text{(the number of learning samples of the cell }k\text{)/(the total number of learning samples)} \quad (3)$$

The degree of importance calculated using equation (3) is determined for each feature point $f_i$ extracted in step S120 based on the illumination direction vector $l_i$ when viewed from the feature point. Likewise, a degree of importance $\beta_k$ is determined by applying the same processing to the normal vector $n_i$ near the feature point. Finally, a degree of importance $\gamma_i$ of each feature point $f_i$ is given by a product of the degrees of importance $\alpha$ and $\beta$ respectively determined from the illumination vector $l_i$ when viewed from the feature point and the normal vector $n_i$ near the feature point. That is, $\gamma=\alpha\times\beta$. A feature point at which a larger number of samples are obtained under the same optical condition at the time of learning assumes a larger frequency of the histogram, that is, a higher degree of importance.

In the subsequent recognition processing, only feature points whose degrees of importance $\gamma_i$ are equal to or larger than a predetermined threshold can be used. Alternatively, the degrees of importance $\gamma_i$ of the feature points can be used as weights at the time of the recognition processing. As for a feature point whose normal vector cannot be obtained, a degree of importance is determined in advance as in the above example.

Figure 4C:
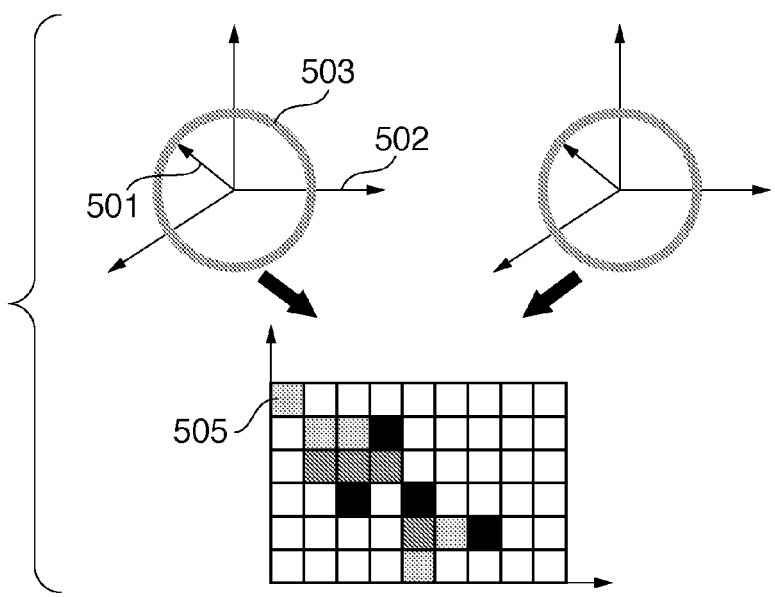

Note that the importance evaluation method is not limited to the aforementioned methods. For example, as shown in FIG. 4C, for each feature point $f_i$, the degree of importance of each cell may be determined by generating a two-dimensional histogram from:

learning samples having the illumination direction vector $l_i$ when viewed from the feature point; and learning samples having the normal vector $n_i$ near the feature point.

Each cell of the two-dimensional histogram indicates the position of the divided plane of the sphere drawn by the illumination direction vector $l_i$ and the normal vector $n_i$ near the feature point. The degree of importance $\gamma_i$ of each feature point $f_i$ is determined for each assigned cell based on the illumination direction vector $l_i$ and normal vector $n_i$.

As described above, in this embodiment, the degree of importance of each feature amount is determined by comparing the obtained physical information and illumination information with samples of physical properties and illumination conditions, which are obtained in advance. For this reason, even in an environment in which the illumination condition changes, feature amounts required to recognize a target object with high precision can be appropriately selected.

Recognition Processing Step (S150)

Finally, in step S150, a target object is recognized by executing predetermined recognition processing using the feature point group, whose degrees of importance are determined in step S140. In this embodiment, like bag-of-keypoints (bag-of-words) (c.f. non-patent reference 4), feature amounts $F_i$ obtained from feature points $f_i$ are quantized to generate a histogram for each image. Then, that histogram is used as a feature amount F of the image.

[Non-Patent Reference 4] J. Zhang, Local Features and Kernels for Classification of Texture and Object Categories: A Comprehensive Study, International Journal of Computer Vision, 2006.

In this case, upon generation of a histogram of the feature amounts $F_i$, the degrees of importance are reflected by weighting them by the degrees of importance determined in step S140. More specifically, for example, the feature points are multiplied by the corresponding degrees of importance, and the products are added to the histogram.

Note that histograms are similarly generated for a learning sample image group, and a hyperplane required to identify images including a captured image of the target object and other images is learned in advance using a Support Vector Machine (SVM). Then, the feature amounts weighted by the degrees of importance and those which have learned in advance are compared to recognize the type and the position and orientation of the target object.

Note that as for histogram feature amounts used in the SVM, not only image features but also the normal vectors obtained in step S130 and optical information held in the illumination information holding unit A300 may be vector-quantized together. Alternatively, like an implicit-shape-model (c.f. non-patent reference 5), recognition processing may be implemented by a method of conducting probability voting from respective local features to a target object center. The probability voting is conducted by multiplying the degree of importance. In case of multiclass problems, after voting is conducted for all classes, a class having a largest number of votes and a position of that class can be used as a recognition result.

[Non-Patent Reference 5] B. Leibe and B. Schiele, Scale-Invariant Object Categorization using a Scale-Adaptive Mean-Shift Search, DAGM'04 Pattern Recognition Symposium.

This embodiment has described the target object recognition method and apparatus. Alternatively, this embodiment can be used as feature importance determination method without step S150.

As described above, according to this embodiment, features (feature portions) and feature amounts are extracted from a captured image, and the degree of importance of each feature is determined based on the physical property of a plane near that feature and at least one of the illumination direction and image capturing apparatus direction when viewed from the feature position. Then, the predetermined recognition processing is executed using the feature amounts weighted by the degrees of importance. For this reason, by focusing attention only on features which suffer less feature amount changes caused by illumination variations, a target object can be stably recognized.

(Functional Arrangement)

Figure 5:
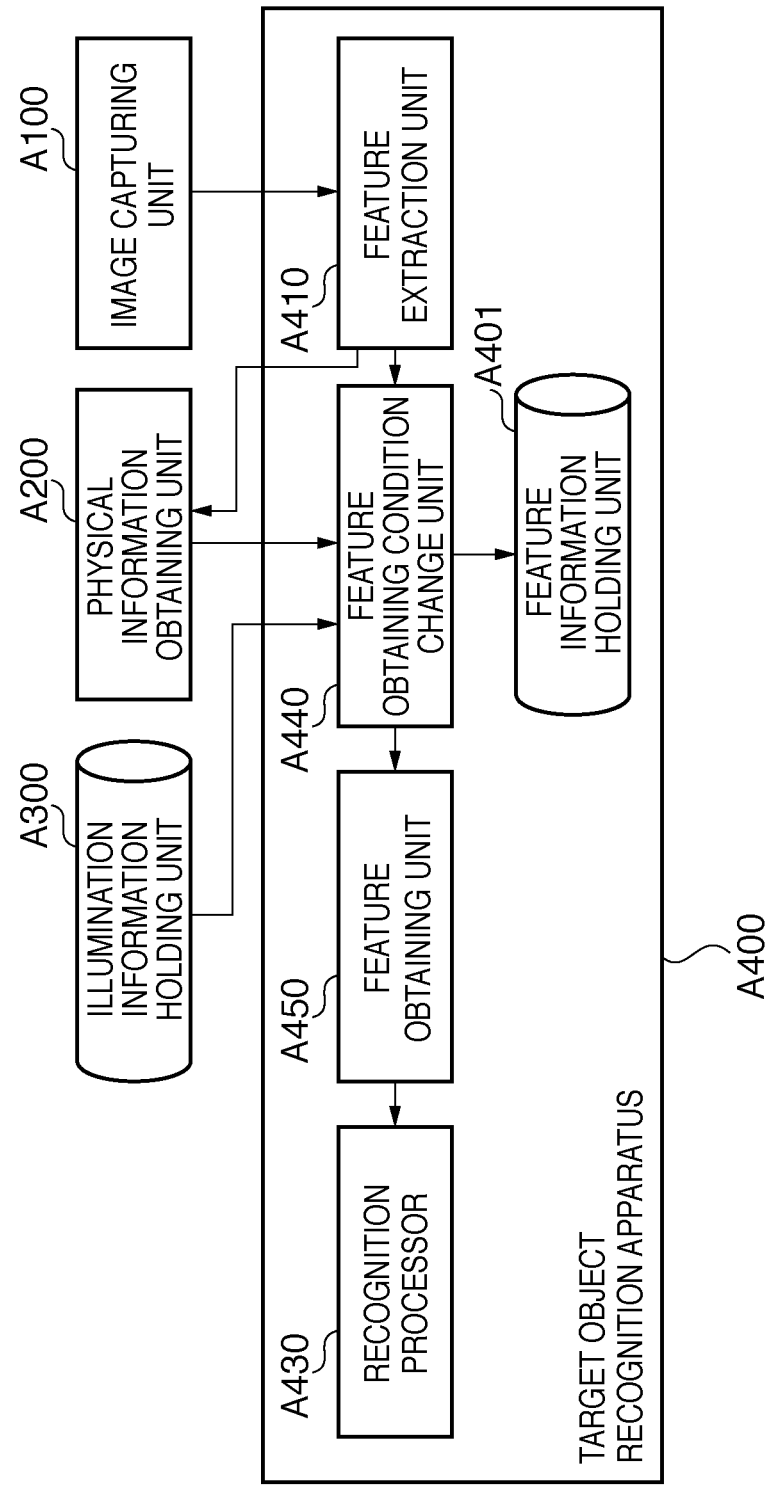
FIG. 5 is a block diagram showing the functional arrangement of a target object recognition system.

FIG. 5 shows a basic functional arrangement of a target object recognition system according to another embodiment. Components A100, A200, A300, A400, A410, A430, and A401 are the same as those of the aforementioned embodiment. The target object recognition system of this embodiment does not have any feature importance determination unit A420, but includes a feature obtaining condition change unit A440 and feature obtaining unit A450. The feature obtaining condition change unit A440 changes a feature obtaining condition based on physical information of a surface of a target object and illumination information. The feature obtaining unit A450 obtains features of a target object again under the changed feature obtaining condition. Note that the feature obtaining condition includes at least one of the position and direction of an illumination and those of an image capturing apparatus at the time of image capturing.

In the aforementioned embodiment, the degree of importance of each feature point obtained at the time of identification is determined based on physical information from learning samples. In this embodiment, by changing a physical condition of features to be obtained at the time of identification from physical information obtained from learning samples, a target object is precisely recognized even when the illumination condition is varied.

(Overview of Target Object Recognition Processing)

Figure 6:
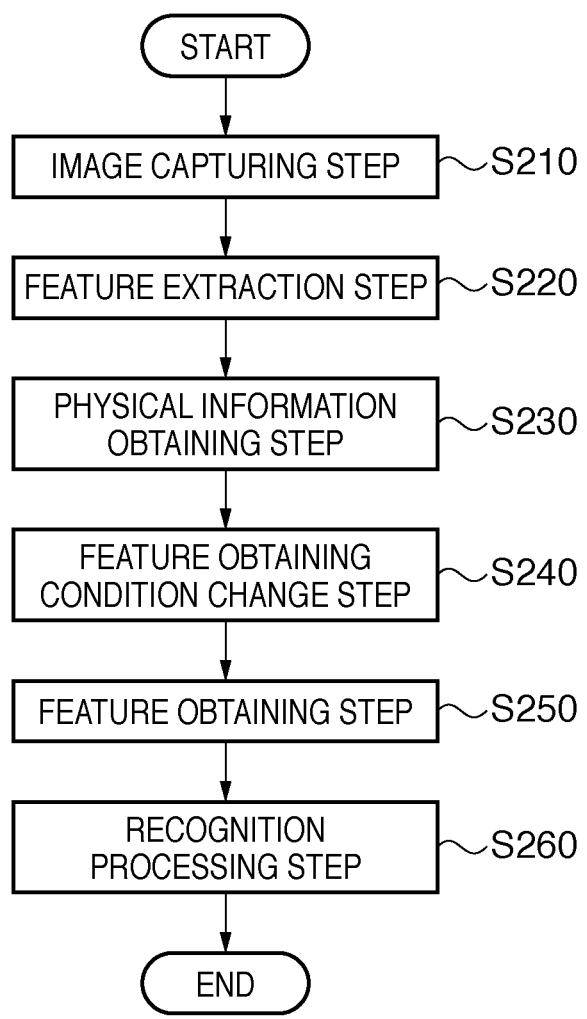
FIG. 6 is a flowchart showing the sequence of target object recognition processing.

The processing sequence will be described below. FIG. 6 shows the processing sequence of this embodiment. Processes in an image capturing step (S210) to a physical information obtaining step (S230) are the same as those in steps S110 to S130 in the aforementioned embodiment.

In a feature obtaining condition change step (S240), for each feature extracted in a feature extraction step (S220), the feature obtaining condition change unit A440 changes a condition for obtaining that feature (feature obtaining condition) by comparing it with information held in advance in the feature information holding unit A401 based on both of:

physical information obtained in step S230; and at least one of an illumination direction and image capturing unit direction when viewed from that feature position, which are held in the illumination information holding unit A300.

The feature obtaining condition includes, for example, the positions/directions of an image capturing apparatus, an illumination device which illuminates a target object, and the target object.

In a feature obtaining step (S250), the feature obtaining unit A450 obtains features and feature amounts again after the feature obtaining condition is changed in step S240. The obtained features are transmitted to the recognition processor A430.

In a recognition processing step (S260), predetermined recognition processing is executed using the features and feature amounts obtained in step S250, thus recognizing a target object.

(Practical Example of Target Object Recognition System)

A practical configuration example of the target object recognition system of this embodiment is nearly the same as FIG. 3A which is referred to in the aforementioned embodiment. However, a computer 50 corresponding to the target object recognition apparatus A400 includes the feature obtaining condition change unit A440 and feature obtaining unit A450 as programs in addition to the feature extraction unit A410 and recognition processor A430. Also, as the feature obtaining condition change unit A440, in this embodiment, an interface which can change the position and orientation of at least one of a camera 10 and illumination 30 is equipped. The computer 50 is connected to the camera 10 and a distance sensor 20, and also to the illumination 30 in some cases.

(Details of Target Object Recognition Processing)

The practical processing contents executed by the target object recognition system according to this embodiment will be explained along the processing sequence shown in FIG. 6.

The image capturing step (S210), feature extraction step (S220), and physical information obtaining step (S230) are the same as steps S110, S120, and S130 in the aforementioned embodiment.

Feature Obtaining Condition Change Step (S240)

In the feature obtaining condition change step (S240), an image capturing condition upon capturing an image of a target object by the image capturing apparatus is changed based on a physical property in a feature portion of the target object indicated by physical information, and an illumination condition indicated by illumination information. More specifically, for each feature point $f_i$ extracted in step S220, the feature obtaining condition is changed by comparing it with feature point information which is held in advance in the feature information holding unit A401 based on both of:

a normal vector $n_i$ obtained in step S230; and at least one of the illumination direction and the image capturing unit direction when viewed from the position of that feature point, which are held in the illumination information holding unit A300.

Figure 3C:
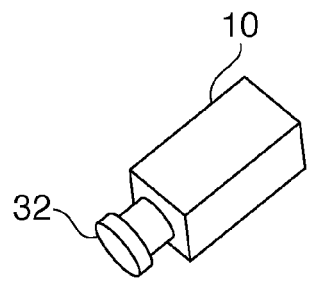

As the precondition upon changing the feature obtaining condition, in this embodiment as well, a histogram of physical information of learning samples is generated in advance, and is held in the feature information holding unit A401. After that, the position/direction of the camera 10 or illumination 30 is changed, so that the distribution of a histogram generated based on a feature point group extracted in step S220 becomes closer to that held in the feature information holding unit A401 in step S240. In this embodiment as well, a case will be explained below wherein the optical axes of the camera 10 and illumination 30 are coaxial with each other, that is, they agree with each other, as shown in FIG. 3C, for the sake of simplicity.

As the physical information used to generate the histogram, as in the aforementioned embodiment, for example, an angle difference between a normal vector associated with each feature point included in learning samples and an illumination direction vector when viewed from the position of that feature point may be used. In this case, a histogram p is normalized by the number of samples, as given by:

$$\sum_{u=1}^{M} p_u = 1 \quad (4)$$

where u is an index of each cell of the histogram, M is the total number of cells of the histogram, and $p_u$ is the frequency of a cell of the index u.

Let q be a histogram of angle differences between normal vectors $n_i$ of feature vectors $f_i$ extracted in step S220 and illumination direction vectors $l_i$ when viewed from the feature points. In this case, as in the histogram p, the histogram q is also normalized by the number N of feature points, as given by:

$$\sum_{u=1}^{M} q_u = 1 \quad (5)$$

A similarity between the histogram p obtained based on the learning samples and the histogram q obtained based on an image feature group obtained in step S220 is calculated, and the position/direction of the illumination 30 (camera 10) is changed to increase that similarity. The similarity between the histograms p and q is expressed by $\rho[p, q]$. A similarity between histograms is evaluated using a Bhattacharyya coefficient, as given by:

$$\rho[p, q] = \sum_{u=1}^{M} \sqrt{p_u \cdot q_u} \quad (6)$$

However, the present invention is not limited to this. For example, the similarity may be evaluated using a histogram-intersection, that is, a $\chi^2$ distance given by:

$$\rho[p, q] = \sum_{u=1}^{M} \min(p_u, q_u) \tag{7}$$

Letting y be the position/direction of the illumination 30 (camera 10), a histogram at y can be expressed by q[y], and a similarity of the histogram is given by:

$$\hat{\rho}(y) = \rho[\hat{p}, \hat{q}[y]] = \sum_{u=1}^{M} \sqrt{\hat{p}_u \cdot \hat{q}_u[y]} \tag{8}$$

Since the position/direction y of the illumination 30 (camera 10) corresponding to the highest similarity need only be calculated, we have:

$$\hat{y} = \arg\max_{y} \hat{\rho}(y) \tag{9}$$

For example, letting $y_0$ be an initial search position/direction, since it is considered that y closer to $y_0$ has a closer histogram value, the Taylor expansion of the Bhattacharyya coefficient yields:

$$\hat{\rho}(y) = \rho[\hat{p}, \hat{q}[y]] \tag{10}$$

$$= \sum_{u=1}^{M} \sqrt{\hat{p}_u \cdot \hat{q}_u[y]} \approx$$

$$\sum_{u=1}^{M} \sqrt{\hat{p}_u} \left\{ \sqrt{\hat{q}_u[y_0]} + \frac{1}{2} \hat{q}_u[y_0]^{-\frac{1}{2}} (\hat{q}_u[y] - \hat{q}_u[y_0]) \right\}$$

$$= \sum_{u=1}^{M} \sqrt{\hat{p}_u} \left\{ \sqrt{\hat{q}_u[y_0]} + \frac{1}{2} \hat{q}_u[y] \frac{1}{\sqrt{\hat{q}_u[y_0]}} - \frac{1}{2} \sqrt{\hat{q}_u[y_0]} \right\}$$

$$= \frac{1}{2} \sum_{u=1}^{M} \sqrt{\hat{p}_u} \sqrt{\hat{q}_u[y_0]} + \frac{1}{2} \sum_{u=1}^{M} \hat{q}_u[y] \frac{\sqrt{\hat{p}_u}}{\sqrt{\hat{q}_u[y_0]}}$$

Since the first term does not depend on y, a problem of searching for y that maximizes a similarity is a problem of maximizing the second term:

$$\frac{1}{2} \sum_{u=1}^{M} \hat{q}_u[y] \frac{\sqrt{\hat{p}_u}}{\sqrt{\hat{q}_u[y_0]}} \tag{11}$$

In this case, y corresponding to a maximum similarity is calculated. Alternatively, y corresponding to a similarity equal to or larger than a threshold may be calculated. As the search method, a search may be conducted using a greedy or Mean-Shift algorithm. In case of the Mean-Shift algorithm, an input histogram is defined by:

$$\hat{q}_u[y] = C_h \sum_{i=1}^{n_h} k\left(\left\|\frac{y - x_i}{h}\right\|^2\right) \delta[b(x_i) - u] \tag{12}$$

$$C_h = \frac{1}{\sum_{i=1}^{n_h} k\left(\left\|\frac{y - x_i}{h}\right\|^2\right)}$$

where $\delta[i]$ is a delta function which assumes "1" when i=0, b(x) is the frequency of the histogram at a position x, and k(d) is a differentiable weighting function which assumes a larger value as the position is closer to the center. Also, $n_h$ is the number of pixels which belong to a bin u, and h is a scale. Substitution of equation (12) into equation (11) yields:

$$\frac{C_h}{2} \sum_{i=1}^{n_h} \omega_i k\left(\left\|\frac{y - x_i}{h}\right\|^2\right) \tag{13}$$

$$\omega_i = \sum_{u=1}^{M} \sqrt{\frac{\hat{p}_u}{\hat{q}_u(y_0)}} \delta[b(x_i) - u]$$

Hence, letting g(x) be a differential of a kernel function, and g(x)=−k'(x), $y_1$ which maximizes equation (13) is given by:

$$\hat{y}_1 = \frac{\sum_{i=1}^{n_h} x_i \omega_i g\left(\left\|\frac{y - x_i}{h}\right\|^2\right)}{\sum_{i=1}^{n_h} \omega_i g\left(\left\|\frac{y - x_i}{h}\right\|^2\right)} \tag{14}$$

Alternatively, the position/direction of the camera 10 or illumination 30 may be changed to increase the number of feature points that match the physical conditions of learning samples which are obtained in advance. In this case, the histogram obtained based on the learning samples, and the histogram q obtained based on the image feature group obtained in step S220 are not normalized by the total numbers. The position/direction of the illumination 30 (camera 10) is changed to maximize the histogram-intersection between the histograms p and q, which is given by equation (7). In this case as well, y corresponding to a similarity equal to or higher than a threshold may be calculated.

As for the histogram calculation method, a two-dimensional histogram may be generated by plotting normal vectors of feature points of learning samples and illumination directions when viewed from the feature points on a sphere, as shown in FIG. 4B, so that each divided plane corresponds to a cell of the histogram.

Feature Obtaining Step (S250)

In the feature obtaining step (S250), a target object is recognized based on feature amounts, which are extracted from a captured image of the target object captured under the image capturing condition changed in step S240. More specifically, after the position/direction of the camera 10 or illumination 30 is change in step S240, an image of a target object 40 is captured by the camera 10 again to obtain image data. From the obtained image data, features and feature amounts are obtained by the same method as in step S220. If optical information is required as feature amounts in the next recognition processing step (S260), physical information near each feature point is also obtained by the same method as in step S230.

Finally, in the recognition processing step (S260), recognition processing is executed by the same processing as in step S150 in the aforementioned embodiment.

As described above, according to this embodiment, features and feature amounts are extracted from a captured image obtained by capturing an image of a target object, and the feature obtaining condition is changed based on the physical property of a surface near each feature, and at least one of the illumination direction and image capturing apparatus direction when viewed from each feature position. After the condition is changed, features and feature amounts are obtained, and predetermined recognition processing is executed. For this reason, appropriate feature amounts can be obtained in correspondence with illumination variations, and a target object can be precisely recognized.

Note that in the description of this embodiment, the image capturing condition is changed so that the physical properties in feature portions on a target object indicated by the physical information and the illumination condition indicated by the illumination information are approximate to samples of physical properties and illumination conditions, which are obtained in advance. Also, in the above description, the image capturing condition is changed, so that the physical properties in feature portions on a target object indicated by the physical information and the illumination condition indicated by the illumination information exhibit a predetermined distribution in association with the feature portions. In these configurations, a target object can be recognized under a recognition condition which is learned in advance and allows precise target object recognition.

Since physical information is obtained for each feature at the time of learning, various physical conditions can be set, and the feature obtaining condition can be changed to be approximate to the distribution of the physical conditions of samples obtained at the time of learning. Alternatively, by changing the feature obtaining condition so as to obtain features effective for recognition, a recognition apparatus which is robust against illumination variations can be realized. As described above, according to the configuration of this embodiment, by changing the feature obtaining condition based on the physical property and at least one of the illumination direction and image capturing apparatus direction when viewed from each feature position, only features robust against illumination variations can be obtained.

Still another embodiment has nearly the same basic functional arrangement and processing sequence as those of the aforementioned embodiment, except for practical processing contents of a feature obtaining condition change step (S240). In the aforementioned embodiment, the feature obtaining condition required to obtain features at the time of recognition is changed according to the distribution (histogram) of learning samples obtained at the time of learning. However, in this embodiment, the feature obtaining condition is changed according to a potential plane (to be described later) obtained at the time of learning.

Figure 7:
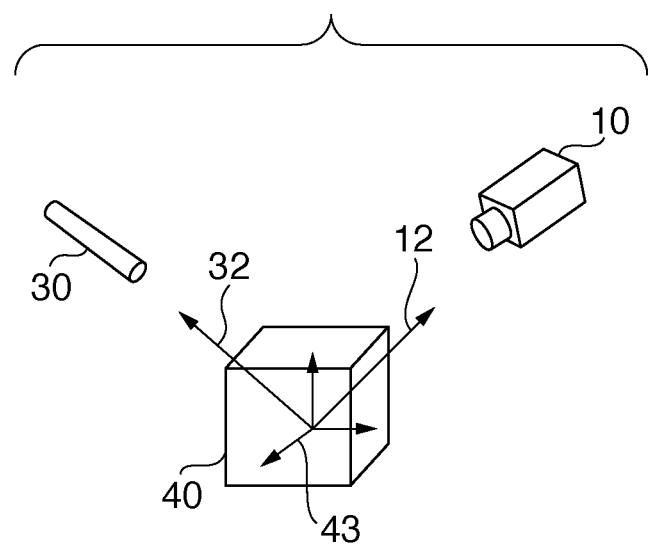
FIG. 7 is a view showing direction vectors of an image capturing unit and illumination when viewed from a target object center.

In this embodiment, learning is made while variously changing the orientation of a target object, the positions/directions of an illumination and image capturing apparatus under the assumption that the positions/directions of the illumination and image capturing apparatus, which are used to capture an image of the target object, are three-dimensionally obtained at the time of learning. FIG. 7 shows an image capturing unit direction vector 12 and illumination direction vector 32 when viewed from a target object center, and a target object coordinate system 43 having the target object center as an origin. For each of features obtained at respective orientations, a normal vector near that feature is obtained using, for example, a distance sensor. In addition, physical information of a surface near that feature is obtained.

After the features are obtained under various conditions, those which are effective for recognition are selected from a feature amount group obtained under the respective conditions. The condition in this case indicates the orientation of the target object, and the positions/directions of the illumination and image capturing apparatus. The features are selected using, for example, a selection information amount (self entropy) and average information amount (entropy). In this embodiment, the number of features whose information amounts exceed a predetermined threshold of the feature amount group obtained under each condition is selected and recorded as an evaluation value. Physical information associated with each feature is stored together as reference data. Note that the evaluation value may be determined by adding the value of the information amount.

In this embodiment, a vector indicating the orientation of the target object is expressed by rotation angles of respective axes of the coordinate system having the target object center as the center, that is, $X=(\phi_1, \phi_2, \phi_3)$. Furthermore, let L be an illumination position vector when viewed from the position of the target object center, and C be an image capturing apparatus position vector. In this manner, let $f(X, L, C)$ be the evaluation value obtained under each condition. This $f(X, L, C)$ will be referred to as a potential plane hereinafter, and will be used at the time of recognition.

In the feature obtaining condition change step (S240), primary recognition processing is executed using features extracted in step S220. In this processing, for example, as in step S150 of the aforementioned embodiment, probability voting can be conducted from respective features to the target object center using an implicit-shape-model. The orientation X can also be calculated based on the relationship between the calculated target object center and respective features. Next, the position/direction of the image capturing apparatus or illumination is changed based on the primary recognition result so as to increase $f(X, L, C)$.

After the position/direction of the image capturing apparatus or illumination is changed, features are extracted again in the feature obtaining step (S250).

Finally, in the recognition processing step (S260), recognition processing is executed in the same manner as in step S150 of the aforementioned embodiment. In this case, only features whose information amount values obtained at the time of learning exceed a predetermined threshold are selected using the physical condition.

As described above, this embodiment has explained the configuration for changing the feature obtaining condition according to the potential planes obtained at the time of learning. In this embodiment as well, since features and feature amounts are obtained after the feature obtaining condition is changed, and predetermined recognition processing is executed, appropriate feature amounts can be obtained in correspondence with illumination variations to precisely recognize the target object as in the aforementioned embodiment.

(Functional Arrangement)

Figure 8:
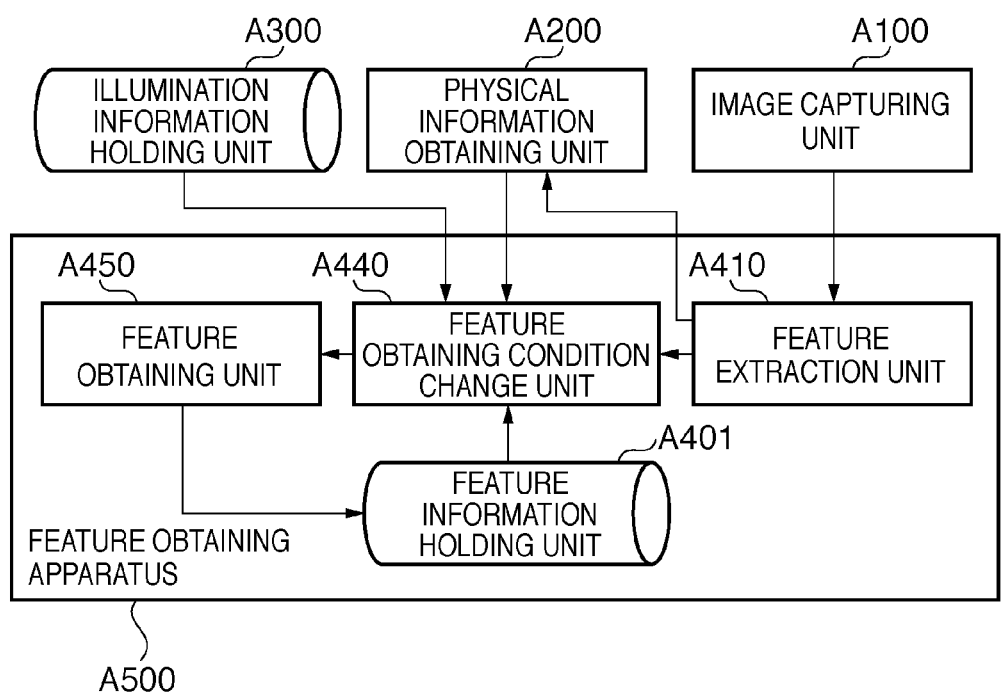
FIG. 8 is a block diagram showing the functional arrangement of a target object recognition system.

FIG. 8 shows a basic functional arrangement of yet another embodiment. The basic functional arrangement of a target object recognition system according to this embodiment is roughly the same as that of the embodiment described with reference to FIG. 5, except that a feature extraction apparatus A500 does not include any recognition processor A430 in this embodiment. The feature extraction apparatus A500 includes a feature extraction unit A410, feature obtaining condition change unit A440, feature obtaining unit A450, and feature information holding unit A401, which fulfill the same functions as those in the aforementioned embodiment.

(Target Object Recognition Processing)

Figure 9:
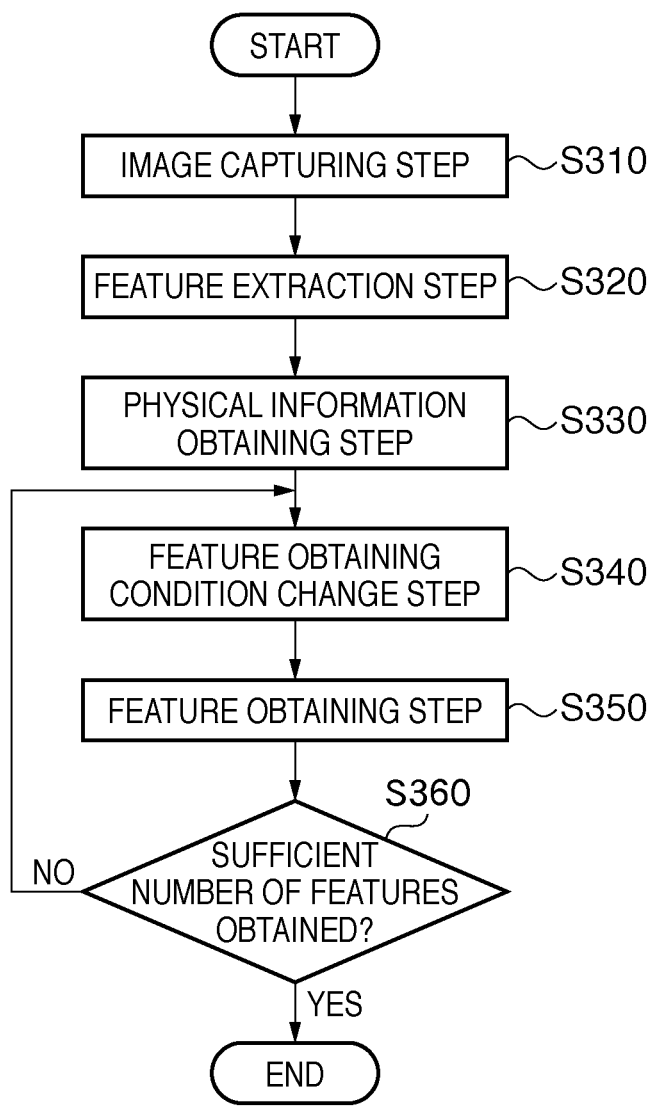
FIG. 9 is a flowchart showing the sequence of target object recognition processing.

The processing sequence of the target object recognition processing will be described below with reference to FIG. 9. The processing sequence of this embodiment is roughly the same as that of the aforementioned embodiment, except that it does not include any recognition processing step. Instead, this processing sequence includes a step (S360) of checking if a sufficient number of features are obtained.

Details of respective steps of the processing sequence shown in FIG. 9 will be described below. An image capturing step (S310), feature extraction step (S320), and physical information obtaining step (S330) are the same as steps S110, S120, and S130 in the aforementioned embodiment.

In a feature obtaining condition change step (S340), for each feature $f_i$ extracted in step S320, the feature obtaining condition is changed by comparing it with feature point information held in advance in the feature information holding unit A401 based on both of:

a normal vector $n_i$ obtained in step S330; and at least one of an illumination direction and image capturing unit direction when viewed from the position of the feature point, which are held in an illumination information holding unit A300.

The feature obtaining condition can be changed by generating a histogram of physical information of samples held in advance in the feature information holding unit A401 in the same manner as in the aforementioned embodiment, and changing the position/direction of a camera 10 or illumination 30 according to the distribution of the histogram. For example, the position/direction of the camera 10 or illumination 30 can be changed to uniform the distribution. Alternatively, the position/direction of the camera 10 or illumination 30 may be changed to keep the distribution shape (to align physical information). More specifically, the histogram is evaluated using a kurtosis and skewness. For example, in order to change the distribution of the histogram to a uniform distribution, the kurtosis is changed to be closer to −1.2 (when a normal distribution is defined as "0"). The position/direction of the camera 10 or illumination 30 is changed to increase features or to delete (select) unnecessary features as needed.

In a feature obtaining step (S350), features are obtained by repeating the processes in steps S340 and S350 after feature points are obtained again until it is determined that a sufficient number of features are obtained. Whether or not a sufficient number of features are obtained can be checked by, for example, seeing whether or not the number of obtained samples reaches a predetermined value. Alternatively, a test set is prepared, and when the recognition ratio becomes equal to or higher than a predetermined threshold, it may be determined that a sufficient number of features are obtained.

As described above, in the configuration of this embodiment, processing for performing image capturing again after the feature obtaining condition is changed is repeated until a sufficient number of features are obtained. For this reason, according to this embodiment, a target object can be stably recognized with a constant precision even in an environment in which the illumination condition changes.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-041003, filed on Feb. 25, 2010, which is hereby incorporated by reference herein in its entirety.

What is claimed is:

1. A recognition apparatus for recognizing a position and an orientation of a target object, comprising:

a processor and a memory which together comprise:

an extraction unit configured to detect a plurality of feature portions from a captured image, and to extract a plurality of feature amounts indicating image characteristics in each of the plurality of feature portions;

a first input unit configured to input normal vectors in the plurality of feature portions on the target object;

a second input unit configured to input at least one of direction of illumination and direction of image capture apparatus at the time of capturing the captured image;

a holding unit configured to hold information with respect to angles between normal vectors in a plurality of feature portions on the target object in a learning image and at least one of direction of illumination and direction of image capture apparatus at the time of capturing the learning image in a learning process;

a determination unit configured to determine respective degrees of importance of the plurality of extracted feature portions based on the input normal vectors, the input at least one of direction of illumination and direction of image capture apparatus, and the held information with respect to angles;

a weighting unit configured to weight each of the plurality of extracted feature amounts based on the determined corresponding degree of importance; and a recognition unit configured to recognize the position and the orientation of the target object based on the plurality of feature amounts weighted by the weighting unit.

2. The apparatus according to claim 1, wherein said determination unit determines the respective degrees of importance by comparing the angles between the input normal vectors and the input at least one of direction of illumination and direction of image capture apparatus with the angles between the normal vectors and the at least one of direction of illumination and direction of image capture apparatus of the learning image in a learning process, which are held in the holding unit.

3. The apparatus according to claim 1, wherein the determination unit determines the respective degrees of importance of the plurality of extracted feature portions further based on a direction of the image capture apparatus when viewed from each feature portion on the target object.

4. The apparatus according to claim 1, wherein the determination unit determines the respective degrees of importance of the plurality of extracted feature portions further based on an object reflectance, a diffusion reflectance, and a specular reflectance in each feature portion on the target object.

5. The apparatus according to claim 1, wherein each feature portion is either a point or a region that occupies a predetermined range.

6. The apparatus according to claim 1,
wherein the information with respect to angles indicates a distribution of angles between the normal vectors and the at least one of direction of illumination and direction of image capture apparatus in the learning process; and
wherein the determination unit determines the respective degrees of importance of the plurality of extracted feature portions to be a higher value the higher number of angles between the normal vectors and the at least one of direction of illumination and direction of image capture apparatus in the plurality of feature portions on the target object included in the distribution of angles is.

7. A method for recognizing a position and an orientation of a target object, comprising:
detecting a plurality of feature portions from a captured image, and extracting a plurality of feature amounts indicating image characteristics in each of the plurality of feature portions;
inputting normal vectors in the plurality of feature portions on the target object;
inputting at least one of direction of illumination and direction of image capture apparatus at the time of capturing the captured image;
determining respective degrees of importance of the plurality of extracted feature portions based on the input normal vectors, the input at least one of direction of illumination and direction of image capture apparatus, and information with respect to angles between normal vectors in a plurality of feature portions on the target object in a learning image and at least one of direction of illumination and direction of image capture apparatus at the time of capturing the learning image in a learning process, said information being held in a holding unit;
weighting each of the plurality of extracted feature amounts based on the determined corresponding degree of importance; and
recognizing the position and the orientation of the target object based on the plurality of feature amounts weighted by the step of weighting.

8. A non-transitory computer-readable storage medium with a program stored thereon to control a computer to function as respective units included in a recognition apparatus according to claim 1.

* * * * *